United States Patent [19]

Ziv et al.

[11] Patent Number: 5,703,902
[45] Date of Patent: Dec. 30, 1997

[54] METHOD AND APPARATUS FOR DETERMINING SIGNAL STRENGTH IN A VARIABLE DATA RATE SYSTEM

[75] Inventors: Noam Abraham Ziv; Roberto Padovani, both of San Diego, Calif.

[73] Assignee: Qualcomm Incorporated, San Diego, Calif.

[21] Appl. No.: 490,694

[22] Filed: Jun. 16, 1995

[51] Int. Cl.[6] .............................. H04B 15/00; H04K 1/00; H04L 27/30

[52] U.S. Cl. .......................... 375/200; 375/228; 375/340; 375/347; 375/372; 370/252; 370/332; 455/67.3; 455/226.2

[58] Field of Search .................... 375/200, 227, 375/228, 340, 341, 347, 367, 372, 373; 370/252, 332; 455/67.1, 67.3, 226.1, 226.2

[56] References Cited

U.S. PATENT DOCUMENTS

| | | | |
|---|---|---|---|
| 4,918,437 | 4/1990 | Jasinski et al. | 340/825.44 |
| 4,968,966 | 11/1990 | Jasinski et al. | 340/825.44 |
| 5,103,459 | 4/1992 | Gilhousen et al. | 375/200 |
| 5,228,054 | 7/1993 | Rueth et al. | 375/200 |
| 5,396,516 | 3/1995 | Padovani et al. | 375/255 |

FOREIGN PATENT DOCUMENTS 9314588 7/1993 WIPO ............... H04L 27/30

*Primary Examiner*—Stephen Chin
*Assistant Examiner*—Don Vo
*Attorney, Agent, or Firm*—Russell B. Miller; Linli L. Golden; Sean English

[57] ABSTRACT

A method and apparatus of determining signal strength, regardless of the signal data rate, in a receiver receiving signals from a variable rate transmitter. The incoming signal is comprised of a series of frames. Each frame is comprised of a number of power control groups containing data. The number of the power control groups containing data within each frame is dependent on the unknown data rate. The position of the power control groups within the frame is a pseudorandom. The signal strength of an incoming signal of unknown data rate is determined based upon an active set of power control groups within a frame. The active set of power control groups contain data independent of the unknown data rate. This signal strength information may be used to indicate that the signal strength is sufficient to perform further signal processing.

21 Claims, 5 Drawing Sheets

METHOD AND APPARATUS FOR DETERMINING SIGNAL STRENGTH IN A VARIABLE DATA RATE SYSTEM

BACKGROUND OF THE INVENTION

1. Field of the Invention

The present invention relates to variable data rate communication systems, particularly to a method utilizing common framing information to detect signal strength.

2. Related Technical Art

In a spread spectrum telephone or personal communication system (PCS), a large number of subscriber units communicate through "cell sites" or "base stations." The communication path used by a base station transmitting data flames to a subscriber unit is called the "forward link". Conversely, the "reverse link" refers to the communication path used by subscriber units to transmit data flames back to a base station.

The system capacity in a spread spectrum communication system may be limited by the total amount of interference present within the system transmission frequency. When transmitting on the same frequency, a signal intended for one user may cause interference with the signals transmitted by other users. The interference is highest when the signal is transmitted continuously. Such resulting interference limits the overall capability of the system.

System interference maybe reduced by decreasing the probability that subscriber units concurrently transmit data over a common frequency. This reduction can be accomplished by transmitting data in bursts and randomly distributing the data burst within a given time frame. A spread spectrum digital communication system, like CDMA, may use a variable rate vocoder capable of producing data at less then the full rate. Data at less than full rate may then be pseudorandomly distributed within a frame using an apparatus such as a data burst randomizer. Further information on an exemplary data burst randomizer can be found in U.S. patent application Ser. No. 08/194,823 titled "DATA BURST RANDOMIZER," filed Feb. 14, 1994 and assigned to the assignee of the present invention and incorporated herein by reference. This pseudorandom distribution of the data throughout the frame reduces the probability of concurrent data transmission by numerous users having framing which may be synchronized.

In one spread spectrum communication system design, a subscriber unit or other transmitter encodes data frames at one of four rates depending on the voice activity of the user, for example, continuous data at "full rate" and lower rates such as at one-half, one-fourth or one-eighth of the full-rate. Each rate that is less than the full rate transmits a corresponding smaller amount of time per frame than the corresponding higher rates. A one-half data rate sends one-half of the time, a one-quarter data rate sends one-quarter of the time, and a one-eighth data rate sends only one-eighth of the time.

In an exemplary variable rate spread spectrum system, the data is represented by a collection of data symbols which are grouped into power control groups. The position of the power control groups within each frame is pseudorandomly determined. The subscriber unit then transmits the frames to a base station or other receiver. Further details on an exemplary method of pseudorandom data formatting can be found in U.S. patent application Ser. No. 08/194,823 referenced above and in the TIA/EIA Interim Standard "Mobile Station-Base Station Compatibility Standard for Dual-Mode Wideband Spread Spectrum Cellular System", TIA/EIA/IS-95, July 1993, Telecommunications Industry Association, Washington, D.C.

A base station receiving a data frame has no advance knowledge of the data rate at which a subscriber unit has encoded the frame. In an exemplary spread spectrum system, a base station receives a frame of data from a subscriber unit every 20 milliseconds (ms). With variable rate encoding, the current frame received by a base station may be encoded at a different data rate than the previously received data frame. The base station, in order to properly process an incoming signal must determine the amount of energy contained in the signal. Given the transmitted data rate, a base station receiving the variable rate data could readily calculate the position of a power control group in a data frame and from this information make an accurate signal strength measurement. However, the base station does not know which data rate has been selected by the subscriber unit at the time it needs to measure the signal strength and can not make such a calculation. Therefore, any method of determining a relative signal strength must be accomplished in a rate independent manner. This invention provides a method of determining signal strength in a rate independent manner.

It is an object of the present invention to make a data rate independent determination of signal strength by utilizing common framing information in a variable data rate communication system.

It is another object of the present invention to use signal strength measurements in a variable rate communication system to indicate that a signal is sufficient for voice and data traffic communication. The invention measures the signal strength and provides a lock indication when the signal can be used for communication.

It is yet another object of the present invention to use signal strength measurements in a rake receiver design to determine if signal combination is appropriate. The invention provides a combine indication when the signal strength is sufficient for diversity signal combination.

SUMMARY OF THE INVENTION

The present invention determines signal strength in a variable rate communication system in a rate independent manner. In the preferred embodiment of the present invention data is grouped in symbols called power control groups. The power control groups are transmitted at various positions within a data frame utilizing a pseudo-random distribution method.

By utilizing a subset of power control groups designated as active power control groups, the accuracy of signal strength measurement is greatly improved. The active power control groups define time intervals during which a power control group is always transmitted. A receiver using the signal energy of only the active power control groups can make an accurate signal strength measurement.

In the preferred embodiment using CDMA, the active power control groups include all power control groups transmitted during the lowest data rate. The time intervals containing power control groups present the lowest data rate also contain power control groups at all higher data rates. The lowest data rate in the preferred embodiment is one-eighth the full transmission rate.

The system operation begins with a reset upon startup or when a demodulator element is assigned to a new input signal. After reset, signal energy levels are collected in the time intervals corresponding to active power control groups.

The higher the energy level of a signal the stronger the signal. The energy levels are stored in one or more memory elements and summed over time to obtain average signal strength measurements. Typically, the memory storage elements containing the oldest measurements are cleared and reused for new energy measurements through a process called aging.

Energy measurements are summed and compared with several threshold levels arranged to create hysteresis. A first predetermined threshold level represents the energy level a signal should have before further signal processing occurs. Signal processing occurs when the summed energy levels meet or exceed the first predetermined threshold. If the energy threshold subsequently drops below the first threshold level but remains above a second threshold level, the processing continues. Only when the signal energy drops below the second predetermined threshold level is the signal strength considered insufficient for a particular signal processing method and further signal processing is terminated.

Threshold levels may be determined based on the signal processing technique to be employed. A pair of locking thresholds may be set if the signal processing requirement calls for a lock indicator. The lock indicator may be used to indicate that the signal received by the receiver is strong enough for demodulating the signal to produce reliable data. The threshold pairs may also be used to enable diversity combining techniques. Receivers, specifically utilizing a rake receiver design, are capable of demodulating multipath versions of the same signal in parallel. Combining several versions of the same signal is a method of recreating the original signal transmitted from the subscriber unit. The exact threshold levels for any signal processing technique are set to achieve a desired result based upon system operating parameters.

The present invention uses the above method in a variable rate communication system to determine if the strength of a given signal is acceptable for communication. When the signal energy detected at the lowest data rate meets certain predetermined threshold energy levels then signal lock and a data combine indicators may be set.

BRIEF DESCRIPTION OF THE DRAWINGS

The features, objects, and advantages of the present invention will become more apparent from the detailed description set forth below when taken in conjunction with the drawings in which like reference characters correspond throughout and wherein.

DETAILED DESCRIPTION OF THE PREFERRED EMBODIMENTS

Accurate signal strength measurement is usually required to maintain a reliable transmission link in a communication system. When a strong and relatively weaker signal each encounter similar interference along a given transmission path the stronger signal typically provides a higher signal-to-noise ratio (SNR) resulting in better communication quality. A communication system capable of measuring the minor energy level variations of a signal may accurately distinguish between these strong and weak signals.

In a variable data rate communication system a signal transmitted by a subscriber unit may contain pseudorandomly distributed data. This distribution method makes accurate signal strength measurement difficult because the data variations appear as fluctuations in signal strength. Ideally, a system capable of locking onto an appropriate signal would make proper signal strength measurements. The present invention provides a lock detection apparatus and method for a variable data rate system which enables measurement of signal strength independent of the data transmission rate.

Figure 5:
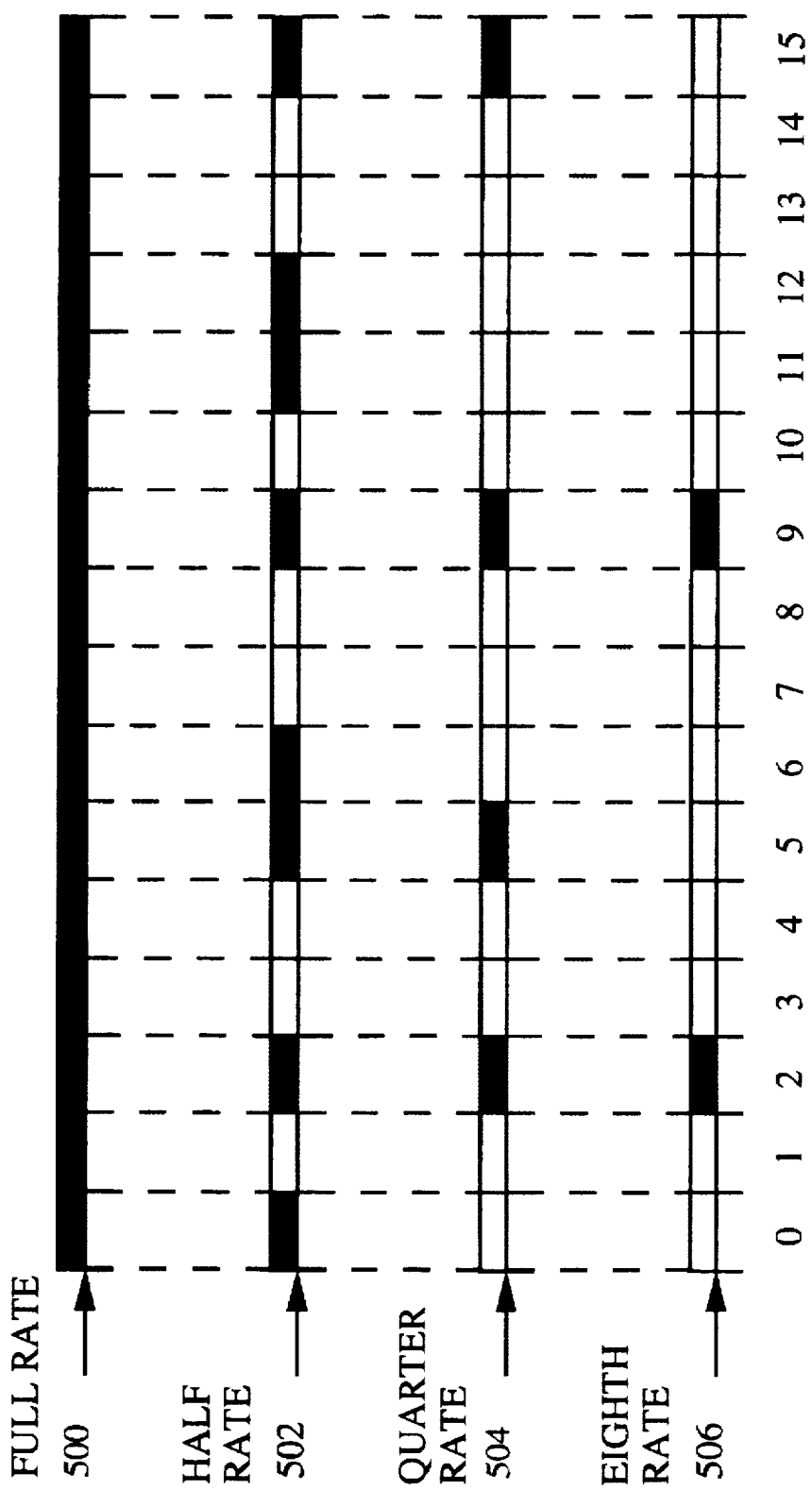
FIG. 5 illustrates how a given frame of dam would be formatted if transmitted at different data rates and received by the receiver of FIG. 2.

Active power control groups contain signal information regardless of the data transmission rate and are a subset of the power control groups within a data frame. In the preferred embodiment, a data frame has 16 power control groups of which at least two are classified as active power control groups. FIG. 5 illustrates an exemplary data frame formatted for transmission at each of the possible data rates. As can be seen in FIG. 5, the power control groups at each rate are blackened. A pseudorandom process, described later, controls the "placement" of power control groups within each frame for transmission. Inspection of this process indicates at least power control groups, the active power control groups, are transmitted in each frame. These active power control groups appear at the same location in a frame regardless of the data rate for the frame. In the preferred embodiment, the active power control groups are transmitted at the one-eighth or lowest data rate. In FIG. 5, two active power control groups, power control groups 2 and 9, are shown by the two blackened intervals in a sample one-eighth rate frame 506. The active power control group position in subsequent frame varies. The location of the active power control groups may be determined in the receiving unit in the same manner as the eighth rate frame positions are determined in the transmitting unit. The location of the active power control groups may be based on one or more parameters such as the identity of the transmitting or receiving unit, the call assignment number, the time of day of the transmission, or the PN coding used by the transmitting or receiving unit.

Accumulating the energy levels indicated by each active power group provides a basis for a reliable signal strength measurement. This approach is an improvement over previous lock detection methods because it limits signal measurement to active power control groups which contain actual data and not all transmitted power control groups within a given frame. Potentially some groups may contain noise thus making the measurement inaccurate.

Another important aspect is the use of multiple threshold levels to measure accumulated signal energy levels. As signals are received, their respective accumulated energy is compared against multiple threshold levels rather than a single energy threshold level. Using multiple threshold levels improves signal detection and decreases false signal detection errors caused by localized energy level fluctuations in the transmitted signal. An exemplary embodiment utilizes two threshold levels when making a signal determination but a more complex scheme utilizing a plurality of threshold levels may be used in more demanding communication environments. For example, an upper threshold level can be used to indicate when the energy level is sufficient for communication. A lower threshold level can be used to indicate when the energy level is not sufficient for communication. When a signal exceeds the upper threshold it may still be considered valid for communication even if subsequent minor fluctuations cause it to dip below the same upper threshold limit. Once the signal exceeds the upper threshold limit, it continues to be considered valid for communication as long as it remains above the lower threshold limit.

Figure 1:
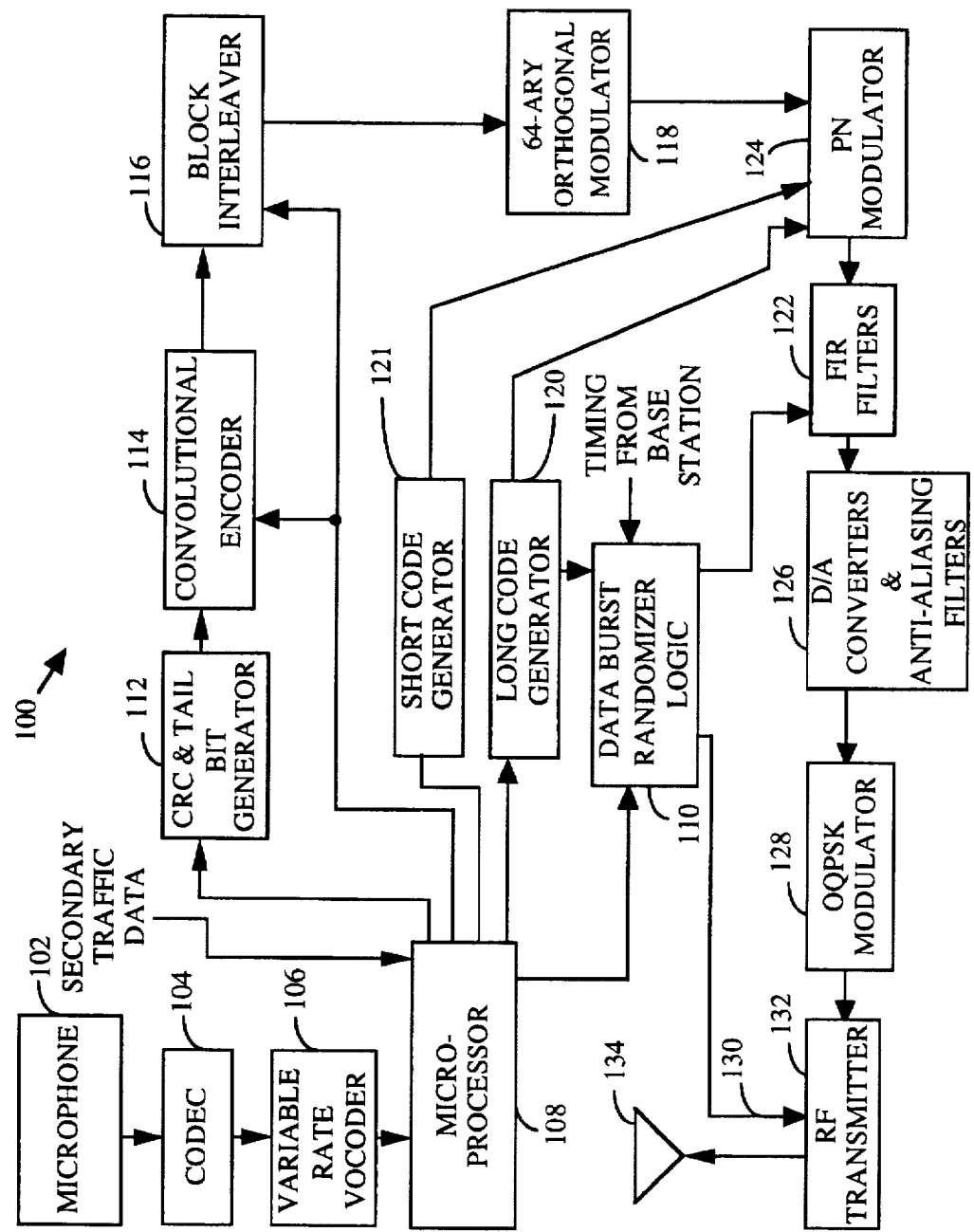
FIG. 1 is a block diagram illustrating an exemplary subscriber unit transmit portion of a variable data rate spread spectrum communication transceiver.

In order to aid in the understanding of the present invention, a brief discussion of the data encoded and transmitted by the subscriber unit is provided. FIG. 1 illustrates an exemplary embodiment of transmit portion 100 in a variable data rate transceiver. In an exemplary communication system, such as CDMA cellular or Personal Communication Network (PCN) variable rate communication system, "forward link" designates a transmission path from a base station to a subscriber unit. Conversely "reverse link" designates the transmission path from the subscriber unit to a base station. Typically, signals sent from a subscriber unit travel over either an access channel or a traffic channel. The access channel is used for short signaling messages such as call originations, responses to pages, and registrations. The traffic channel is used to communicate (1) primary traffic, typically user speech data, (2) secondary traffic, typically user non-speech data, (3) signaling traffic, such as command and control signals, (4) a combination of primary traffic and secondary traffic, or (5) a combination of primary traffic and signaling traffic.

Transmit portion 100, when functioning in a mode in which primary traffic is present, communicates acoustical signals, such as speech and/or background noise, as digital signals over the transmission medium. To facilitate the digital communication of acoustical signals, these signals are sampled and digitized using well known techniques. For example, in FIG. 1, sound is converted by a microphone 102 into an analog signal which is then converted to a digital signal by a codec 104. Codec 104 typically performs an analog to digital conversion process using a standard 8 bit/μlaw format technique. In the alternative, the analog signal may be directly converted to digital form in a uniform pulse code modulation (PCM) format. In an exemplary embodiment, codec 104 uses 8 kHz sampling and provides an output of 8-bit samples at the sampling rate, so as to realize a 64 kbps data rate.

The 8-bit samples are output from codec 104 to variable rate vocoder 106 where a μlaw/uniform code conversion process is performed. In variable rate vocoder 106, the input data samples are organized into frames having a predetermined number of samples. In a preferred implementation of variable rate vocoder 106, each frame comprises on the order of 160 samples or about 20 ms. of speech at the 8 kHz sampling rate. It is understood by those skilled in the art that other sampling rates and flame sizes may be used as desired for specific communication system designs. Each frame of sampled speech is variable rate encoded by variable rate vocoder 106. The vocoder data packets are then output to a microprocessor 108 and associated circuitry for additional formatting.

Microprocessor 108 receives data packets every 20 ms along with an indication of the rate at which the speech was encoded. Microprocessor 108 also receives, if present, an input of secondary traffic data. Microprocessor 108 also internally generates signaling data (i.e. commands) for transmission. Microprocessor 108 typically includes program instructions contained within a program instruction memory, a data memory, and appropriate interface and related circuitry as is known in the art. Data is output from microprocessor 108 to CRC & tail bit generator 112 every frame. CRC and tail bit generator 112 computes a set of check bits for data at certain data rates and also generates a set of tail bits for each frame.

In FIG. 1, flames of data with check bits and tail bits are output to convolutional encoder 114. In an exemplary embodiment, convolutional encoder 114 preferably encodes the input data using a rate ⅓, constraint length k=9 convolutional code. For example, convolutional encoder 114 is constructed with generator functions of $g_0$=557(octal), $g_1$=663(octal) and $g_2$=711(octal). As is well known in the art, convolutional encoding involves the modulo-2 addition of selected taps of a serially time-shifted delayed data sequence. The length of the data sequence delay is equal to k−1, where k is the code constraint length. Since in the preferred embodiment a rate ⅓ code is used, three code symbols, the code symbols ($c_0$), ($c_1$) and ($c_2$), are generated for each data bit input to the encoder. The code symbols ($c_0$), ($c_1$) and ($c_2$), are respectively generated by the generator functions $g_0$, $g_1$ and $g_2$. The code symbols are output from convolutional encoder 114 to an interleaver 116. The output code symbols are provided to interleaver 116 in the order of code symbol ($c_0$) being first, code symbol ($c_1$) being second and code symbol ($c_2$) being last. Tail bits can be used at the end of each flame to reset convolutional encoder 114 to an all-zero state in preparation for the next frame.

The symbols output from convolutional encoder 114 are provided to block interleaver 116 which, under the control of microprocessor 108, repeats and interleaves the code symbols. Code symbols, typically stored in random access memory (RAM), are arranged in a manner whereby the code symbol repetition varies with the data transmission rate. When the transmission data rate is full rate, the interleaver operates at a 100% duty cycle and the code symbols from block interleaver 116 are not repeated. At half rate the interleaver operates at a 50% duty cycle and each code symbol is repeated one time (i.e. each symbol occurs two times). At quarter rate, the interleaver operates at a 25% duty cycle and each code symbol is repeated three times (i.e. each symbol occurs four times). At the eighth data rate, the interleaver operates at a 12.5% duty cycle and each code symbol is repeated seven times (i.e. each symbol occurs eight times). For all data rates, the code repetition results in a constant code symbol rate of 28,800 code symbols per second for the data as output from block interleaver 116. Ultimately, as described below, only one occurrence of each code symbol is actually transmitted on the reverse link. In this example, interleaver 116 is a block interleaver, constructed by methods well known in the art, and provides an output of the code symbols over a time period spanning 20 ms.

Referring again to FIG. 1, the interleaved code symbols are output from block interleaver 116 to 64-ary orthogonal modulator 118 in flames corresponding to a symbol rate of 28.8 kilosymbols per second (ksps). Typically, modulation over the reverse link spread spectrum communication channel uses M-ary orthogonal signaling. For example, when using 64-ary orthogonal signaling, each six code symbols provided by block interleaver 116 results in one of 64 possible modulation symbols being selected and output by modulator 118. Each 64-ary modulation symbol typically corresponding to Walsh functions contains 64 chips. For more detailed information on the use of Walsh functions and M-ary orthogonal signaling see U.S. Pat. No. 5,103,459, entitled "SYSTEM AND METHOD FOR GENERATING SIGNAL WAVEFORMS IN A CDMA CELLULAR TELEPHONE SYSTEM," issued Apr. 7, 1992 which is assigned to assignee of the present invention and incorporated herein by reference. Although a 64-ary modulation scheme is employed for purposes of illustration, higher or lower M-ary modulation schemes may be used.

Each symbol is output from modulator 118 to one input of modulo-2 adder, exclusive-OR gate within pseudorandom (PN) modulator 124. The symbols are output from modulator 118 at a 4.8 ksps rate which corresponds to a Walsh chip rate of 307.2 kilochips per second (kcps). The other input to the exclusive-OR gate is provided from long code generator 120 which generates a masked pseudorandom noise (PN) code. The long code sequence provided from long code generator 120 is at a chip rate four times the Walsh chip rate of modulator 118, i.e. a PN chip rate 1.2288 megachips per second (Mcps). The exclusive-OR gate within PN modulator 124 combines the two input signals to provide an intermediary output of data at the chip rate of 1.2288 Mcps.

The long code sequence is a time shift of a sequence of length $2^{42}-1$ chips and is generated by a linear generator well known in the art using the following polynomial:

$$p(x) = x^{42} + x^{35} + x^{33} + x^{31} + x^{27} + x^{26} + x^{25} + x^{22} + x^{21} + x^{19} + x^{18} + x^{17} + x^{16} + x^{10} + x^7 + x^6 + x^5 + x^3 + x^2 + x^1 + 1. \quad (4)$$

The intermediary output within PN modulator 124 is respectively provided as one input to a pair of modulo-2 adders (e.g. exclusive-OR gates). The other input to each of the gate pair are second and third PN sequences used to cover the modulated signal. The second and third PN sequences, or "short codes", are provided by individual I and Q Channel PN generators contained within short code generator 121. The data is OQPSK spread prior to actual transmission using the second and third PN sequences. The OQPSK spreading on the reverse link traffic channel uses the same I and Q PN codes as the forward channel I and Q pilot PN codes. The I and Q PN codes generated by short code generator 121 are of length $2^{15}$ and are preferably zero-time offset codes with respect to the forward link channel as perceived by the subscriber unit. For purposes of further understanding, on the forward link channel pilot signal is generated for each base station. Each base station pilot channel signal is spread by the I and Q PN codes as just mentioned. The I and Q PN codes of all base stations are the same, however, between base stations the codes are offset by a shift of the code sequence, so as to provide a distinction between base station transmission. The generating functions for the I and Q short PN codes are:

$$P_I(x)=x^{15}+x^{13}+x^9+x^8+x^7+x^5+1 \quad (5)$$

and $$P_Q(x)=x^{15}+x^{12}+x^{11}+x^{10}+x^6+x^5+x^4+x^3+1. \quad (6)$$

Short code generator 121 may be constructed as is well known in the art so as to provide an output sequence in accordance with equations (5) and (6). An example of such a code generator is disclosed in U.S. Pat. No. 5,228,054 entitled "POWER-OF-TWO LENGTH PSEUDO-NOISE SEQUENCE GENERATOR WITH FAST OFFSET ADJUSTMENT", issued Jul. 13, 1993 and assigned to the assignee of the present invention and incorporated by reference herein.

The I and Q waveforms are respectively output from the pair of modulo-2 adders (e.g. exclusive-OR gates) and respectively provided as inputs to a pair of finite impulse response (FIR) filters 122. FIR filters 122 are digital filters which bandlimit the resulting I and Q waveforms. FIR digital filters 122 shape the I and Q waveforms such that the resulting spectrum is contained within a given spectral mask. FIR filters 122 may be constructed according to well known digital filter techniques and preferably provide a desired frequency response.

The binary '0' and '1' inputs to FIR filters 122, generated by the PN spreading functions, are mapped into +1 and −1, respectively. The sampling frequency of the digital filter is 4.9152 MHz=4×1.2288 MHz. An additional binary '0' and '1' input sequence synchronous with the I and Q digital waveforms is provided to FIR filters 122. This particular sequence, referred to as a masking sequence, is the output generated by a data burst randomizer. The masking sequence multiplies the I and Q binary waveforms to produce a ternary (−1, 0, and +1) input to FIR filters 122.

As discussed previously the data rate for transmission on the reverse link traffic channel is variable (9.6, 4.8, 2.4, or 1.2 kbps) and varies on a frame-by-frame basis. Because the frames are of a fixed 20 ms length for the reverse link traffic channel, the number of information bits per frame is 192, 96, 48, or 24 for transmission at data rates of 9.6, 4.8, 2.4, or 1.2 kbps, respectively. As described previously, the information is encoded using a rate ⅓ convolutional encoder and then the code symbols are repeated by a factor of 1, 2, 4, or 8 for a data rate of 9.6, 4.8, 2.4, or 1.2 kbps, respectively. The resulting repetition code symbol rate is thus fixed at 28,800 symbols per second (sps). This 28.8 ksps stream is interleaved as previously described.

Prior to transmission, the reverse link channel signal is gated such that select symbols are deleted and the remaining symbols are transmitted. As the data rate changes the transmission gate duty cycle also varies. When the transmit data rate is full rate (9.6 kbps), the transmission gate allows all the symbols to be transmitted. However, when the transmit data rate is half rate (4.8 kbps), the transmission gate allows only one-half of the symbols to be transmitted. At quarter rate (2.4 kbps) the transmitter gate allows one-quarter of the symbols to be transmitted. Likewise, at eighth rate (1.2 kbps), the gate allows one-eighth of the symbols to be transmitted through the same gating process.

The gating process operates by dividing each frame into a predetermined number of equal length periods, called power control groups. Each power control group contains 12 bits or 36 data symbols in the form of 6 Walsh symbols wherein each Walsh symbol is comprised of 64 Walsh chips. Certain power control groups are gated on (i.e., transmitted), while other groups are gated off (i.e., not transmitted). The determination of gated-on and gated-off groups is controlled by data burst randomizer logic 110. The gated-on power control groups are pseudorandomized in their positions within a frame so that the actual traffic load on the reverse link channel is averaged in that different subscriber units randomize the power control groups differently thus spreading the energy of the system pseudorandomly in the time domain. In addition, the gated-on power control groups are such that every code symbol input to the repetition process is only transmitted once. During the gated-off periods, the subscriber unit does not transmit energy and reduces interference to other subscriber units operating on the same reverse link channel frequency and conserves subscriber unit energy.

The transmission gating process may be disabled for certain transmissions, such as when the subscriber unit is attempting to access the system or when transmitting other non-traffic messages. In such an example, the subscriber unit may transmit messages at a 4.8 kbps data rate with the code symbols repeated once (each symbol occurs twice) for transmission.

In the implementation of the data burst randomizer function, data burst randomizer logic 110 generates a masking stream of 0's and 1's that pseudorandomly mask out the redundant data generated by the code repetition. The masking stream pattern is determined by the data rate and by a block of 14 bits taken from the long code sequence generated by long code generator 120. The mask bits are synchronized with the data flow and the data is selectively masked by these bits through the operation of FIR filters 122. Within data burst randomizer logic 110 the 1.2288 MHz long code sequence output from long code generator 120 is input to a 14-bit shift register, which is shifted at a 1.2288 MHz rate. The contents of this shift register are loaded into a 14-bit latch exactly one power control group (1.25 ms) before each reverse link traffic channel frame boundary. Logic 110 uses this data along with the rate input from microprocessor 108, to determine, according to a predetermined algorithm, the particular power control group(s) in which the data is to be allowed to pass through FIR filters 122 for transmission. Logic 110 thus outputs for each power control group a '1' or '0' for the entire power control group depending on whether the data is to be filtered out ('0') or passed through ('1'). Further details on the data burst randomizer function are disclosed in the previously mentioned TIA/EIA/IS-95 standard and in copending U.S. patent application Ser. No. 08/194,823 entitled "DATA BURST RANDOMIZER" which is assigned to the assignee of the present invention and incorporated by reference herein.

In FIG. 1, the I channel data output from FIR filters 122 is provided directly to a digital to analog (D/A) converter and anti-aliasing filter circuit 126. The Q channel data however is output from FIR filters 122 to a delay element (not shown) which adds one-half PN chip time delay (406.9 nsec) in the Q channel data. The Q channel data is then output from the delay element to digital to analog (D/A) converter and anti-aliasing filter circuit 126. Circuit 126 converts the digital data to analog form and filters the analog signal. The signals output from circuit 126 are provided to Offset Quadrature Phase Shift Key (OQPSK) modulator 128 where they are modulated and output to RF transmitter 132. RF transmitter 132 amplifies, filters, and frequency upconverts the signal for transmission. RF transmitter 132 may also receive signal 130 from logic 110 to turn the transmitter on during portions of the frame to be transmitted and off at other times. The RF signal is output from transmitter 132 to antenna 134 for communication to the base station.

Data that is transmitted on the reverse link channel is encoded, interleaved, modulated by M-ary orthogonal modulation, and direct-sequence PN spread prior to transmission. Table I further defines the relationships between data values, symbols, and transmission rates on the reverse link traffic channel. Because the frames are of a fixed 20 ms. length for both the access channel and the reverse link traffic channel, the number of information bits per frame is 192, 96, 48, or 24 for transmission at data rates of 9.6, 4.8, 2.4, or 1.2 kbps, respectively.

TABLE I

| Bit Rate (kbps) | 9.6 | 4.8 | 2.4 | 1.2 |
|---|---|---|---|---|
| PN Chip Rate (Mcps) | 1.2288 | 1.2288 | 1.2288 | 1.2288 |
| Code Rate (bits/code symbol) | 1/3 | 1/3 | 1/3 | 1/3 |
| TX Duty Cycle (%) | 100.0 | 50.0 | 25.0 | 12.5 |
| Code Symbol Rate (sps) | 28800 | 28800 | 28800 | 28800 |
| Modulation (code symbol/Walsh symbol) | 6 | 6 | 6 | 6 |
| Walsh Symbol Rate (sps) | 4800 | 4800 | 4800 | 4800 |
| Walsh Chip Rate (kcps) | 307.20 | 307.20 | 307.20 | 307.20 |
| Walsh Symbol Duration(μs) | 208.33 | 208.33 | 208.33 | 208.33 |
| PN Chips/Code Symbol | 42.67 | 42.67 | 42.67 | 42.67 |
| PN Chips/Walsh Symbol | 256 | 256 | 256 | 256 |
| PN Chips/Walsh Chip | 4 | 4 | 4 | 4 |

Figure 2:
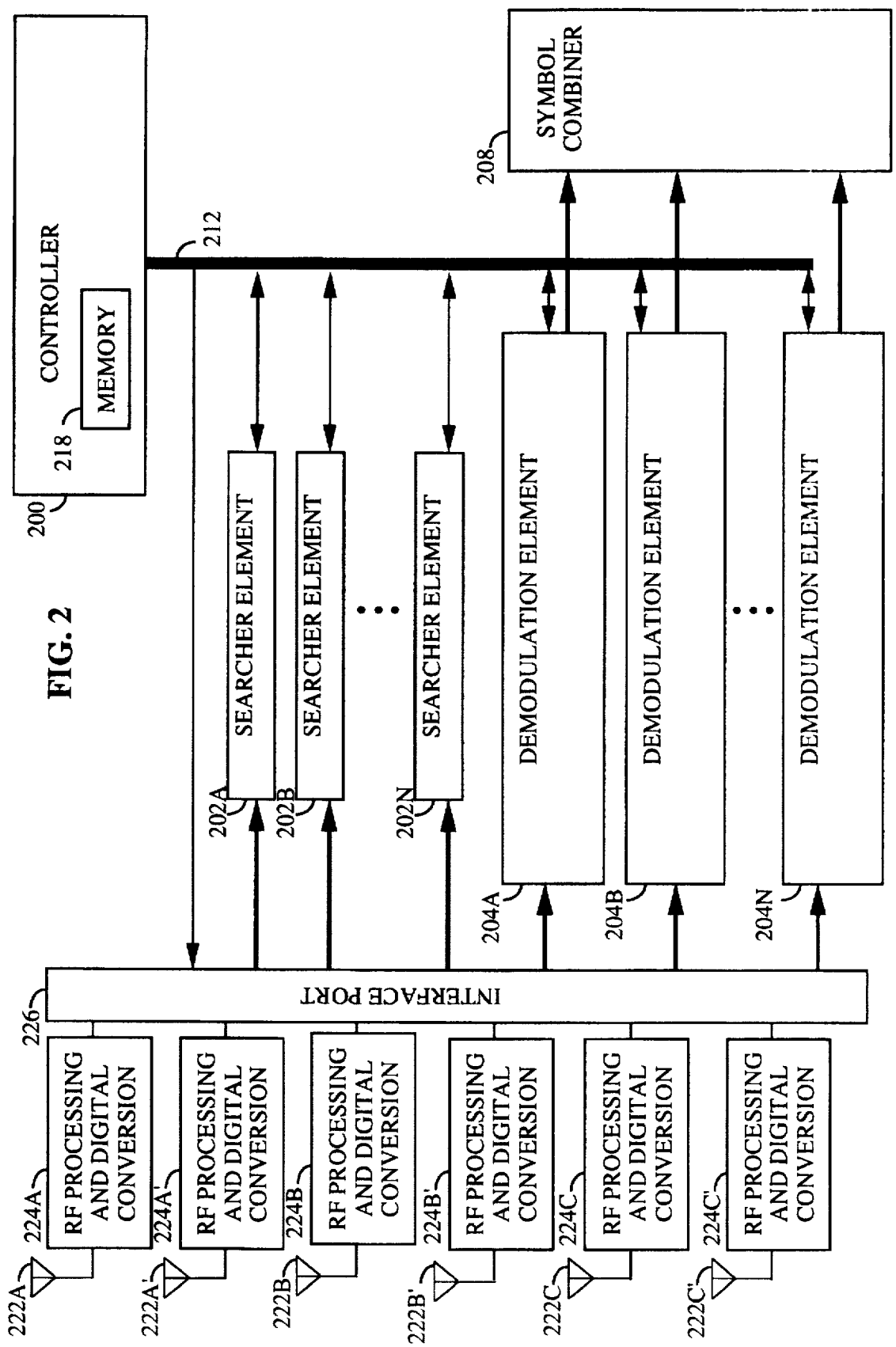
FIG. 2 is a block diagram illustrating an exemplary base station receiver comprising multiple independent demodulation elements.
Figure 3:
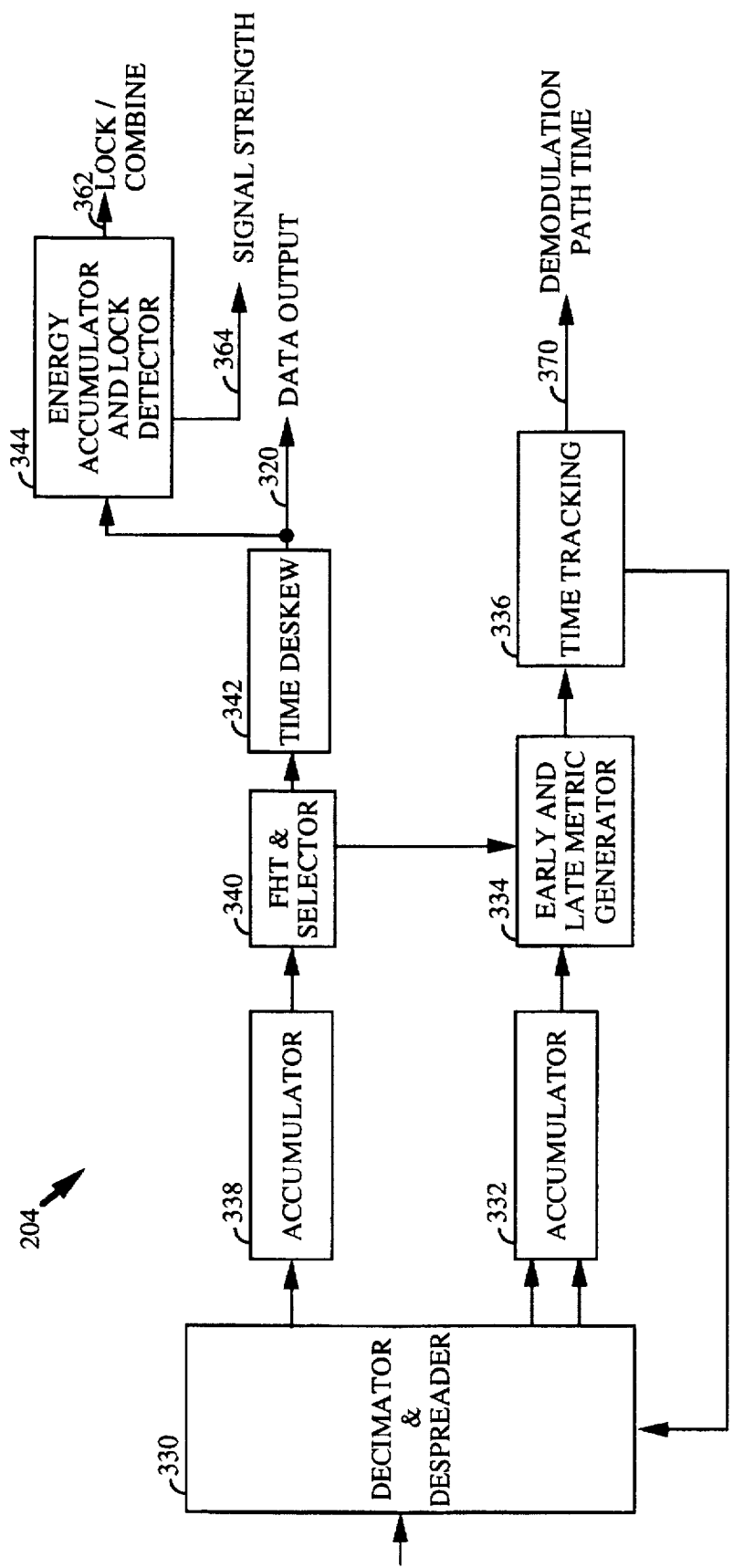
FIG. 3 is a detailed block diagram illustrating the location of an exemplary lock detection apparatus within an exemplary base station receiver demodulation element.

In order to further aid in the understanding of the present invention, the signal reception and processing preceding the present invention will be discussed. FIG. 2 illustrates how a signal transmitted from the subscriber unit is received and processed by a base station. FIG. 3 details how a received signal is processed by demodulation unit 204 and eventually arrives at energy accumulator and lock detector 344.

A typical base station receiver has at least one demodulation element which utilizes at least one lock detector apparatus in the demodulator unit to assist in signal detection. Likewise, a base station comprising multiple independent demodulation elements may utilize a plurality of such detectors. FIG. 2 illustrates an embodiment of a base station having multiple demodulation elements. FIG. 2 represents a three-sectored base station where each of antennas 222A-222C is the antenna for one sector. Each of antennas 222A'-222C' corresponds to one of antennas 222A-222C and is the diversity antenna for the sector corresponding to the like numbered antenna. Each of antennas 222A-222C covers the same coverage area as the corresponding antenna of antennas 222A'-222C'. In a typical base station, antennas 222A-222C have overlapping coverage areas that subdivide the base station into three sectors where each antenna covers more than one third of the total aggregate coverage area of the base station. Therefore a signal from a single subscriber unit may be present at more than one antenna at a time. The number of sectors and the number of antennas assigned to each sector may vary. Variations of this type do not effect the general principles of the present invention.

Antennas 222A, 222B, 222C, 222A', 222B', and 222C' supply the received signal to RF processing and digital conversion circuitry 224A, 224B, 224C, 224A', 224B', and 224C' respectively. RF processing and digital conversions 224A, 224B, 224C, 224A', 224B', and 224C' process the RF signal and convert the signal to digital data. RF processing and digital conversion circuitry 224A, 224B, 224C, 224A', 224B', and 224C' filter the digital data and provide the resulting digital data to interface port 226. Interface port 226 may connect any of the six incoming signal paths to any of the searcher elements or demodulation elements under the control of controller 200 through interconnection 212.

The searcher and demodulation elements are also controlled by controller 200 through interconnection 212. Searcher elements 202A-202N continually scan a time domain window in search of a particular subscriber unit's information signal as controlled by system controller 200. Searcher elements 202A1-202N also scan a set of time offsets around the nominal arrival of the signal in search of multipath signals that have developed.

Searcher elements 202A-202N pass the received data to controller 200 for storage in memory 218. Searcher elements 202A-202N may pass data through a standard bus or searcher elements 202A14 202N may pass data to memory 218 through direct memory access (not shown). Controller 200 uses the data stored in memory 218 to assign demodulation elements 204A-204N to one of the plurality of information signals from a single subscriber unit.

In order to provide a rapid searching process, more than one searcher element is used to conduct a full search. Each of searcher elements 202A-202N is assigned by the controller 200 to search a set of time offsets. Each of searcher elements 202A-202N supplies back to controller 200 the results of the search it performs. Controller 200 tabulates these results for use in the assignment method.

Demodulation elements 204A-204N demodulate the received signal so as to produce data symbols that are combined in symbol combiner 208. The output of symbol combiner 208 (not shown) is aggregate soft decision data suitable for Viterbi decoding. Symbol combiner 208 can combine signals from just one sector to produce an output or it can combine symbols from multiple sectors as selected by interface port 226. When symbol combiner 208 is combining signals from a subscriber unit that is communicating through more than one sector, this state is referred to as softer handoff. The base station may send the output of symbol combiner 208 to a cellular system controller where symbols from a common subscriber unit also combine with signals from other base stations to produce a single output. This process is referred to as soft handoff. Demodulation elements 204A-204N also provide several output control signals to controller 200 through interconnection 212 that are used in the assignment process such as a lock or unlock indication.

Each of demodulation elements 204A-204N is highly similar in structure to the others. FIG. 3 illustrates in further detail demodulation element 204 of FIG. 2. In FIG. 3, the digitized input signal is assumed to be an Offset Quadrature Phase Shift Keyed (OQPSK) signal having in-phase (I) and quadrature-phase (Q) signal samples. The I and Q signal samples, each being a multiple-bit value, are input to decimator and despreader 330. Typically the I and Q signal samples are over-sampled in that the input is received at a data rate higher than the chip rate. In decimator and despreader 330, the data is decimated from the over-sampled data rate to the PN chip rate. The data is then despread by decimator and despreader 330 using the same three PN sequences used to modulate this signal in the subscriber unit.

Decimator and despreader 330 outputs despread I and Q signal components to accumulator 338. Accumulator 338 accumulates the despread I and Q signal components over a Walsh Chip period to produce accumulated I and Q chip data. The accumulated I and Q chip data is then processed by the Fast Hadamard Transformer (FHT) and selector 340. The FHT portion of FHT and selector 340 correlates the accumulated I and Q chip data with all possible Walsh sequences. Each I and Q correlation result is then used to estimate the magnitude of the corresponding Walsh symbol. The magnitude estimates from each of the I and Q correlation results are compared with each other. The Walsh symbol corresponding to the I and Q correlation result that has the largest energy is selected by the selector portion of FHT and selector 340 as the demodulated Walsh symbol. The demodulated Walsh symbol is output along with the corresponding estimated magnitude of that Walsh symbol.

Due to the different arrival times of signal paths assigned to the different demodulation elements, demodulation element 204 performs a de-skewing of the symbols. Time de-skew 342 delays the output such that each demodulation element provides synchronized symbol data with relation to the other demodulation elements.

Energy accumulator and lock detector 344 sums a series of consecutive Walsh symbol energy. The resulting sum is output as signal strength 364 to controller 200 (FIG. 2) for use in assignment of the demodulation elements 204. The resulting sum is also compared with thresholds to indicate a locked or unlocked state and to indicate a signal combining state.

The arrival time of the signal path assigned to demodulation element 204 may change over time because of movement of the subscriber unit or change in the subscriber unit's surroundings. Therefore, base station demodulation element 204 incorporates time tracking circuitry. Decimator and despreader 330 outputs an early and a late version of despread I and Q signal components to be used in the time tracking process. Accumulator 332 accumulates the early and the late, despread I and Q signal components over a Walsh chip period to produce accumulated early and late, I and Q chip data. Early and late metric generator 334 multiplies the accumulated early and late, I and Q chip data by the Walsh sequence corresponding to the demodulated Walsh symbol and accumulates the result to produce early and late, I and Q Walsh symbols. The magnitude of the early Walsh symbol is found based on the early I and Q Walsh symbol and the magnitude of the late Walsh symbol is found based on the late I and Q Walsh symbol. The early symbol magnitude is subtracted from the late symbol magnitude to produce an error metric. The error metric is output to time tracking circuitry 336. Time tracking circuitry 336 uses the error metric to determine if the despreading operation in decimator and despreader 330 is running ahead, behind, or on time. Time tracking circuitry 336 also keeps track of absolute demodulation path time of the demodulation element for output to controller 200 (FIG. 2).

Searcher elements 202A-202N, in FIG. 2, are similar to the demodulation element with the exception that the searcher elements do not have time tracking and lock detection. Time tracking is not needed in searcher elements 202A-202N because the searching process is done rapidly, relative to the channel's coherence and the time drifts are negligible during the time used to perform a single search. For similar reasons, a lock detector apparatus, the current invention, is also not needed for searcher elements 202A-202N.

An objective of this invention is to provide a reliable method of determining the strength of a signal containing variable rate data transmitted by the subscriber unit and received by the base station for lock detection purposes. Depending on the data rate selected by the subscriber unit, symbols contained in power control groups are transmitted in a deterministic pseudorandom position within a reverse link transmission frame. The lock detector of the present invention, contained within demodulation element 204 in FIG. 2 and FIG. 8, indicates the signal strength of a received signal.

The signal strength measurement made by energy accumulator and lock detector 344 is important for several reasons. The main benefit of this method of signal strength measurement is a quick and reliable estimate of the strength of the signal as demodulated. The present invention produces an immediate response to rapidly changing signal strength as generated by the rapid fading characteristics of the terrestrial channel. Note that a more accurate signal strength measurement could be made after the data rate of the incoming signal has been made. However, the rate determination process typically includes that step of Viterbi decoding which introduces a delay. In the present invention, the signal strength indication can be used to determine if the incoming signal is even of sufficient strength to be worthy of combination with the output from the other demodulation elements and subsequent Viterbi decoding. The signal strength could be used to temporally disable time tracking during periods of low signal strength. It can be used as an indication that the demodulation element should be reassigned to a new time offset.

Figure 4:
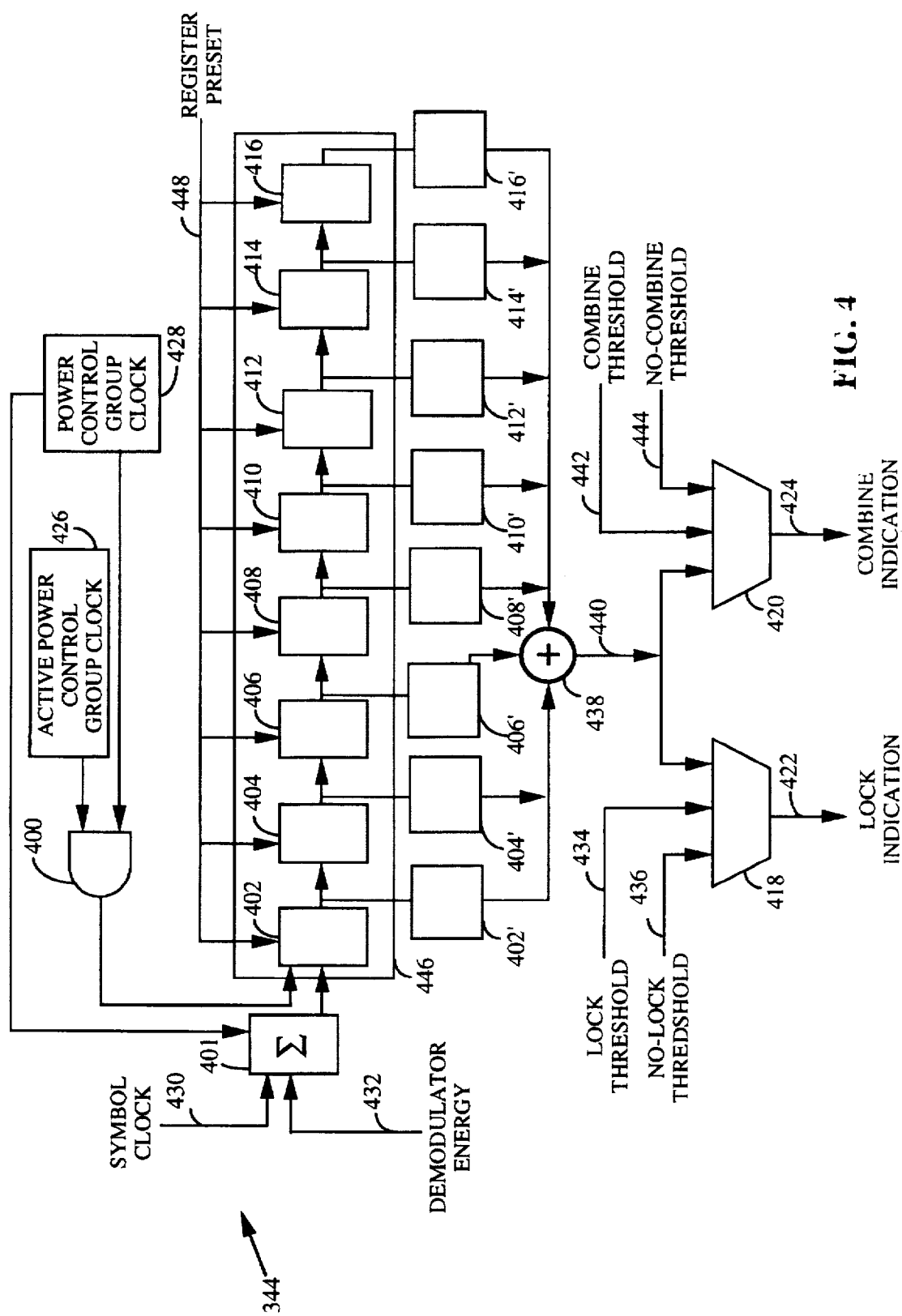
FIG. 4 is an illustration of an exemplary lock detection apparatus operating according to the principles of the present invention.

An exemplary implementation of the invention is illustrated in FIG. 4. Demodulator energy 432 is used to determine, in a rate independent manner, whether the signal strength is sufficient for use by the receiver. If the signal strength equals or exceeds pre-determined lock threshold levels, the received signal is considered sufficient for communication and lock indicator signal 422 is set appropriately. The demodulation element is considered locked to the incoming signal.

Using a similar method as above, a combine indicator signal may be provided if signal strength is sufficient for use with diversity combination techniques. Once the detected signal energy level reaches a pre-determined combine threshold level, the received signal strength is considered sufficient for combination and combine indicator signal 424 is set appropriately.

First, power control group clock 428 provides a signal which indicates at which times within a fixed length frame a power control group may be present. As noted above, an exemplary frame occupies a 20 ms time interval and is further subdivided into a set of 16 power control groups of 1.25 ms. The power group clock signal indicates the beginning of each of the 16 power control groups within every frame.

Due to the signal gating process, which occurs at the subscriber unit when data transmission is less than full rate, some power control groups contain no data. The active power control groups are a minimum subset of power control groups which contain data at all data transmission rates. The active power control group clock signal provides an indication of the location and frequency of a gated-on power control group independent of the data rate.

The base station receiver uses the same long PN code for despreading that was used at the subscriber unit to spread the signal. The long PN code is used also at the subscriber unit to position the power control groups within the frames at the various rates. Similarly, the long PN code is used to identify the active power control groups at the base station. Until complete synchronization is determined the active power groups can be used as an indication that signal synchronization is achieved.

An exemplary embodiment uses the lowest rate in the communication system to determine which time subintervals constitute the active power control group. The active power control groups at the lowest data rate are a subset of power control groups containing data at all higher rates. Therefore, basing lock indication only on the active power control groups ensures accurate signal strength measurements. An exemplary one-eighth rate frame 506 in FIG. 5 shows that the two power control groups which contain data are considered as active power control groups 2 and 9. These two power control groups are considered active power control groups because had they been transmitted in one-quarter rate frame 504, one-half rate frame 502 or full-rate frame 500 these same power control groups would still contain data. In this example, sampling signal strength for all frames as a one-eighth rate frame 506 ensures accurate strength measurement regardless of the actual data rate. The teachings of the invention also contemplate selecting other active power control groups based upon criteria other than the lowest data rate in the system.

In FIG. 4 the Walsh symbol energy level values output from a demodulator element 201 (FIGS. 2 and 3) are provided as demodulator energy signal 432 to one input of accumulator 401. The other input of accumulator 401 is symbol clock signal 430. In response to symbol dock signal 430, accumulator 401 sums six input Walsh chip energy level values corresponding to one power control group. The summed value is output to a filter comprised of shift register 446 and digital adder or summer 438. Accumulator 401 is reset or cleared for summation of the next set of Walsh chip energy level values corresponding to the next power control group.

Active power control group clock 426 and power control group clock 428 are coupled to inputs of "AND" gate 400. Both active power control group clock 426 and power control group clock 428 will each provide a signal indication when an active power control group is being received. Power control group clock 426 may be implemented as a two-phase clock so as to provide a first clock signal to AND gate 400 and a delayed clock signal to a reset input of accumulator 401.

When both inputs to AND gate 400 are indicated, the energy value in accumulator 401 is output to shift register 446. An exemplary shift register 446, which is coupled to and responsive to AND gate 400, consists of a plurality of serially connected register stages 402-416 which store the summed energy levels of numerous active power control groups. Shift register 446 accepts a new energy measurement in register stage 402 and shifts previous energy information from register stage 402 into subsequent register stage 404 in response to AND gate 400. Subsequent register stages 404-414 also shift their current energy measurements into their respective subsequent register stages 406-416 in response to AND gate 400. This method is a first-in-first-out (FIFO) method of collecting energy samples loaded into shift register 446 which, in this example, comprises eight register stages. Many variations on the types of shift registers and shift registers of greater or fewer stages may be used. Furthermore, numerous methods for shifting values between such register stages may be used depending on the specific application and are considered within the teachings of this invention.

Register preset signal 448 is coupled to register elements 402-416, located within shift register 446, for loading the register with a set of predetermined values. As will be seen, the values loaded into this register may be used to initially enable or disable the combine or lock indication.

The energy level of each register stage 402-416 within shift register 446 is each coupled to the input of summer 438. Summer 438 takes the individual energy level values provided by each register stage 402-416 and provides a summed energy level value 440 representing the sum of energy levels in energy value shift register 446. It is apparent that shift register 446 and summer 438 perform a filter function of the FIR (finite impulse response) type. Furthermore, an optional set of energy weighting elements 402'-416' can be used to modify the individual energy level contribution made by each register element to summed energy level value 440. The strength of a signal received by the demodulator element is related to the total energy indicated by the output of summation unit 401. The higher the collective energy level present in register stages 402-416, the more likely that the demodulated signal can be used for communication.

Summed energy level 440 is respectively provided as one input to each one of a pair of comparators 418 and 420. The other inputs to comparator 418 are lock threshold signal 434 and no-lock threshold signal 436. Depending on the value of summed energy level 440, lock threshold signal 434, and no-lock threshold signal 436, lock indication signal 422 may be provided. The second comparator operates similarly. Additional inputs to comparator 420 are combine threshold signal 442 and no-combine threshold signal 444. Depending on the value of summed energy level 440, combine signal 442, and no-combine signal 444, combine indication signal 424 may be provided.

Operation of the lock detection method begins with a system reset, typically either upon system startup or when the corresponding demodulator element is assigned a new signal. In either case, each new signal occupies a unique time offset. When a new signal is assigned, existing data is removed from register stages 402-416 and shift register 446 is preloaded with predetermined initial data. The shift register stages are then ready to begin evaluation of the demodulator signal energy being received. In an exemplary embodiment, the initial data set is loaded such that the lock detector provides lock indication only after actual energy levels are shifted into shift register 446. The values which are used to initialize the filter are chosen by the systems designer based upon known system requirements. The system operator may decide that the detector should initially lock onto the signal and thus would pre-load shift register 446 with values which would initially indicate the signal as locked.

As previously mentioned, shift register 446 stores eight energy values and shifts in new energy values each active power group clock interval using a FIFO data storage strategy. In an exemplary embodiment, energy summer 438 sums energy values stored in eight most recent active power groups and provides a total energy measurement. In one implementation, the energy summer 438 weighs the contribution from each register stage of the lock detector shift register equally and provides the resulting accumulated energy signal 440 to both lock comparator 418 and combine comparator 420.

Another implementation of summer 438 might vary the energy contribution from each power group depending on the relative length of time shift register 446 has been holding the power group energy. Varying the energy contribution as a function of time is called aging. Typically, a filter element which has received a new power group represents the status of the current signal strength more accurately than any other filter element. For example, energy weighting element 402' associated with register stage 402 may be set such that register stage 402 contributes a larger percentage to the energy summation than subsequent register stages 404-416. Energy weighting elements 404'-416' may be set such that the register stages 404-416 contribute less energy value, in proportion to register stage 402, to summer 438. Various combinations of energy weighting elements 402'-416' may be used to fine tune a filter if the number of filter elements increase or if more control of signal detection is needed in general. Furthermore, the filter function may be performed by utilizing an IIR (infinite impulse response) filter as is well known in the art.

In either implementation described above, a hysteresis of threshold levels are compared with the summed energy as provided by summer 438 to determine if a locking indication signal or combine indication should be made. A hysteresis of energy levels reduces fluctuations in lock indication due to transient fluctuations in energy received by a demodulation element. For example, when accumulated energy signal 440 meets or exceeds the value of lock threshold signal 434, lock indication 422 is provided. Once lock indication signal 422 has been provided, a subsequent drop in the value of accumulated energy signal 440 must go below no-lock threshold level 436 to disable lock indication signal 422. When the accumulated energy signal 440 drops below no-lock threshold signal 436, the signal strength is no longer considered sufficient for communication and lock indication signal 422 will no longer be provided. The actual lock indication levels may be calibrated according to empirical data collected over a period of time.

A similar hysteresis of threshold levels can be compared with accumulated energy signal 440 to determine when a diversity combine indication signal 424 should be made. For example, when accumulated energy signal 440 meets or exceeds threshold signal 442, combine indication 424 is provided. Combine indication signal 424 is evidence that the current signal being received by a particular demodulation element may be combined with other multipath versions of the same signal provided by other demodulation elements to improve overall signal-to-noise ratios (SNR). Accumulated energy signal 440 must subsequently drop below a no-combine threshold level 444 before combine indication signal 424 is no longer provided. In an exemplary embodiment, combine threshold signal 442 is greater than no-combine threshold 444. When accumulated energy signal 440 drops below the second combine threshold the signal strength is no longer considered sufficient for multipath diversity combination techniques and combine indication signal 424 is no longer provided. The actual combine indication levels may be calibrated according to empirical data collected over a period of time.

The previous description of the preferred embodiments is provided to enable any person skilled in the art to make or use the present invention. The various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

We claim:

1. A method of determining a signal strength of an incoming signal in a system receiving variable rate data wherein said incoming signal is comprised of a series of frames, each frame having a corresponding unknown data rate, each frame comprised of a plurality of data segments wherein the number of said data segments containing data in each frame depends upon said corresponding unknown data rate, said corresponding unknown data rate may correspond to one of at least a highest data rate and a lowest data rate, said method comprising the steps of:

receiving a first energy value corresponding to a first one of said data segments; and summing said first energy value with a previously accumulated total if said first one of said data segments corresponds to a data segment containing data at said lowest data rate to produce an estimate of said signal strength.

2. The method of claim 1 wherein each of said plurality of data segments is comprised of a set of chips, further comprising the steps of:

receiving a set of energy values corresponding to a plurality of chips within said first one of said data segments; and adding said set of energy values corresponding to said plurality of chips to produce said first energy value.

3. The method of claim 1 wherein said step of summing further comprises the steps of:

storing said first energy value in a first storage register wherein said first storage register is one of a plurality of storage registers each storing a value corresponding to a previously stored energy value;

removing an oldest stored value stored in said plurality of storage registers; and adding together each said previously stored energy values and said first energy value to produce said estimate of said signal strength.

4. The method of claim 1 wherein said step of summing further comprises the steps of:

storing said first energy value in a first storage register wherein said first storage register is one of a plurality of storage registers each storing a value corresponding to a previously stored energy value;

scaling each previously stored energy value according to a scaling constant associated with each of said plurality of storage registers; and adding together each said scaled previously stored energy values and said first energy value to produce said estimate of said signal strength.

5. The method of claim 1 wherein said first energy value is received from a demodulation element assigned to a single propagation of said incoming signal and wherein said estimate of said signal strength is compared to a threshold to determine if said demodulation element is locked onto said single propagation.

6. The method of claim 1 wherein said first energy value is received from one of a plurality of demodulation elements each assigned to a single propagation of said incoming signal, further comprising the steps of:

comparing said estimate of said signal strength to a combine threshold signal; and enabling combination, based on a result of said step of comparing, of an output data signal from said one of said plurality of demodulation elements with an output data signal corresponding to a second one of said plurality of demodulation elements, said combination producing a resultant aggregate signal.

7. The method of claim 1 wherein said data segments containing data are pseudorandomly positioned within each of said frames, further comprising the step of determining an active set of data segments corresponding to a first frame based on an identity of a unit transmitting said incoming signal wherein said active set of data segments corresponds to data segments containing data if said incoming signal is at said lowest rate.

8. The method of claim 1 wherein said data segments containing data are pseudorandomly positioned within each of said frames, further comprising the step of determining an active set of data of segments corresponding to a first frame based on a time of delay wherein said active set of data segments corresponds to data segments containing data if said incoming signal is at said lowest rate.

9. The method of claim 1 wherein said unknown data rate may correspond to an intermediate data rate, wherein said data segments containing data are pseudorandomly positioned within each of said frames, 4 and wherein within a given frame said data segments containing data at said lowest rate are positioned as a subset of data segments containing data at said intermediate rate and said data segments containing data at said intermediate rate are positioned as a subset of data segments containing data at said highest rate.

10. The method of claim 1 wherein said step of summing comprises the steps of:

storing said first energy value in a first energy storage register wherein said first energy register is one of a series of first-in-first-out (FIFO) storage registers such that each previously stored value is transitioned by one storage register and an oldest stored value is deleted from a final storage register; and adding together a value stored in each one of said series of FIFO storage registers.

11. The method of claim 10 wherein said first energy value is received from a demodulation element assigned to a single propagation of said incoming signal and wherein said estimate of said signal strength is compared to a threshold to determine if said demodulation element is locked onto said single propagtion of said incoming signal, further comprising the step of initializing said series of FIFO storage registers when said demodulation element is assigned to a new propagation of said incoming signal.

12. The method of claim 11 wherein said step of initializing said series of FIFO storage registers comprises the step of storing in said series of FIFO storage registers a set of values which correspond to a locked condition.

13. The method of claim 11 wherein said step of initializing said series of FIFO storage registers comprises the step of storing in said series of FIFO storage registers a set of values which correspond to an unlocked condition.

14. The method of claim 1 further comprising the steps of:

comparing said estimate of said signal strength to a first threshold level;

indicating a sufficiency condition if said estimate of said signal strength exceeds said first threshold level;

comparing said estimate of said signal strength to a second lower threshold level after indication of said sufficiency condition; and removing said sufficiency condition if said estimate of said signal strength falls below said second lower threshold level.

15. The method of claim 14 wherein said first energy value is received from a demodulation element assigned to a single propagation of said incoming signal and wherein said demodulation element comprises a time tracking function, further comprising the step of disabling said time tracking function upon removal of said sufficiency condition.

16. The method of claim 14 wherein said first energy value is received from a demodulation element assigned to a single propagation of said incoming signal and wherein removal of said sufficiency condition indicates that said demodulation element is available for assignment to a different propagation of said incoming signal.

17. An apparatus providing a signal strength estimate comprising:

a demodulation element having an output producing a series of symbol energies corresponding to a data signal of an unknown data rate;

a summation register having an input coupled to said demodulation element output, having an enable input, and having an output producing a sum of a plurality of said series of symbol energies conditioned upon a signal received by said enable input;

an active group clock having an output coupled to said enable input of said summation register, said output producing an indication of a group of said series of symbol energies corresponding to symbols containing data independent of said unknown data rate of said data signal;

a first-in-first-out storage register having an input coupled to said summation register output and having a plurality of outputs each producing an indication of a previous value of said sum at said output of said summation register; and an adder having a plurality of inputs coupled to each of said plurality of outputs of said first-in-first-out storage register and having an output producing said signal strength indication.

18. An apparatus for determining a signal strength of an incoming signal in a system receiving variable rate data wherein said incoming signal is comprised of a series of frames, each frame having a corresponding unknown data rate, each frame comprised of a plurality of data segments wherein the number of said data segments containing data in each frame depends upon said corresponding unknown data rate, said corresponding unknown data rate may correspond to one of at least a highest data rate and a lowest data rate, said method comprising the steps of:

means for receiving a first energy value corresponding to a first one of said data segments; and means for summing said first energy value with a previously accumulated total if said first one of said data segments corresponds to a data segment containing data at said lowest data rate to produce an estimate of said signal strength.

19. The apparatus for determining a signal strength of claim 18 wherein each of said plurality of data segments is comprised of a set of chips, further comprising the steps of:

means for receiving a set of energy values corresponding to a plurality of chips within said first one of said data segments; and means for adding said set of energy values corresponding to said plurality of chips to produce said first energy value.

20. The apparatus for determining a signal strength of claim 18 wherein said step of summing further comprises the steps of:

means for storing said first energy value in a first storage register wherein said first storage register is one of a plurality of storage registers each storing a value corresponding to a previously stored energy value;

means for removing an oldest stored value stored in said plurality of storage registers; and means for adding together each said previously stored energy values and said first energy value to produce said estimate of said signal strength.

21. The apparatus for determining a signal strength of claim 18 wherein said means for summing further comprises:

means for storing said first energy value in a first storage register wherein said first storage register is one of a plurality of storage registers each storing a value corresponding to a previously stored energy value;

means for scaling each previously stored energy value according to a scaling constant associated with each of said plurality of storage registers; and means for adding together each said scaled previously stored energy values and said first energy value to produce said estimate of said signal strength.

* * * * *